United States Patent [19]
Gibson et al.

[11] Patent Number: 5,835,719
[45] Date of Patent: Nov. 10, 1998

[54] APPARATUS AND METHOD FOR REMOTE WAKE-UP IN SYSTEM HAVING INTERLINKED NETWORKS

[75] Inventors: Glen Gibson, San Ramon; Thomas J. Runaldue, San Jose; Ching Yu, Santa Clara, all of Calif.

[73] Assignee: Advanced Micro Devices, Inc., Sunnyvale, Calif.

[21] Appl. No.: 972,093

[22] Filed: Nov. 17, 1997

Related U.S. Application Data

[63] Continuation of Ser. No. 472,463, Jun. 7, 1995, abandoned, which is a continuation-in-part of Ser. No. 326,691, Oct. 20, 1994, abandoned.

[51] Int. Cl.$^6$ ................................................. G06F 13/38
[52] U.S. Cl. ...................... 395/200.51; 395/653
[58] Field of Search ..................... 395/200.3, 200.68, 395/200.5, 200.51, 653; 340/825.03, 825.06, 825.07

[56] References Cited

U.S. PATENT DOCUMENTS

| | | | |
|---|---|---|---|
| H1413 | 2/1995 | Gunn | 375/222 |
| 4,549,302 | 10/1985 | Heatherington | 375/221 |
| 4,680,581 | 7/1987 | Kozlik | 340/825.06 |
| 4,730,251 | 3/1988 | Aakre et al. | 364/200 |
| 5,089,813 | 2/1992 | DeLuca et al. | 340/825.44 |
| 5,136,580 | 8/1992 | Videlock | 370/60 |
| 5,196,728 | 3/1993 | Jaux | 307/10.1 |
| 5,305,321 | 4/1994 | Crayford | 370/94.1 |
| 5,353,283 | 10/1994 | Tsuchiya | 370/60 |
| 5,381,414 | 1/1995 | Gibson | 370/311 |
| 5,404,544 | 4/1995 | Crayford | 395/750 |
| 5,465,926 | 11/1995 | Brown | 246/348 |
| 5,475,847 | 12/1995 | Ikeda | 395/750 |
| 5,485,625 | 1/1996 | Gumkowski | 395/800 |
| 5,495,516 | 2/1996 | Lee et al. | 379/1 |
| 5,517,620 | 5/1996 | Hashimoto | 395/200.1 S |
| 5,530,808 | 6/1996 | Hammond | 395/200.02 |
| 5,577,210 | 11/1996 | Abdous | 395/200.1 |
| 5,609,560 | 3/1997 | Ichikawa | 600/101 |
| 5,734,842 | 5/1998 | Leung | 395/284 |

*Primary Examiner*—Tod R. Swann
*Assistant Examiner*—Christopher S. Chow
*Attorney, Agent, or Firm*—Fliesler, Dubb, Mayer & Lovejoy

[57] ABSTRACT

An apparatus and method for remote wake-up of an intended node within a data exchange system having interlinked networks (e.g., router-interlinked LAN's) is disclosed. A wake-up commanding format is disclosed wherein a sequence corresponding to the address of the intended node is embedded N consecutive times (e.g., at least 16 consecutive times) extensively through the respective data fields of one or more packets sent from a remote source node to the intended node. When this particular sequence is received by the intended node while the intended node is in a sleep mode, a wake-up operation is responsively initiated so that the sleeping node will awaken, at least for a time, to respond to future received packets.

38 Claims, 5 Drawing Sheets

APPARATUS AND METHOD FOR REMOTE WAKE-UP IN SYSTEM HAVING INTERLINKED NETWORKS

CONTINUATION APPLICATION INFORMATION

This application is a continuation of Ser. No. 08/472,463, filed Jun. 7, 1995, now abandoned, which is a continuation-in-part of Ser. No. 08/326,691, filed Oct. 20, 1994, now abandoned and continued as Ser. No. 08/881,067, filed Jun. 24, 1997.

FIELD OF THE INVENTION

This invention relates generally to local area networks (LAN's), and more particularly to the remote wake-up of components connected to a local area network.

BACKGROUND OF INVENTION

Communication between multiple users across large distances via a network has become almost a necessity in today's global marketplace. A Local Area Network (LAN) is a specific type of network which can support peer-to-peer communication over distances ranging from tens of meters to several kilometers. LAN's have a finite transmission range. Thus, in order to allow users outside a particular LAN group to access another LAN or wide area network (WAN) group, routers and bridges are used to connect different networks together.

A specific type of LAN is the ethernet, where information from multiple users travels through the network by use of a system bus in the form of discrete packets containing a number of pieces of information. A typical information packet contains a series of fields: a Destination Address Field; a Source Address Field; a Length Field; a Data Field where the user information is present and, in some cases, an error checking field.

Presently, there is a trend, due to the increasing use of lap top and other portable computers which operate on battery power for manufacturers to develop systems that have power conservation features or that can operate in a low power mode. Due to the increasing consumer demand for low power operation capability, the ability to wake-up a remote device in the SLEEP (low power) mode without the use of the Central Processing Unit (CPU) or other Power Managed circuitry which requires a lot of power and decreases battery life is becoming increasingly important to manufacturers. For a device that is in a low power mode, there is no simple and efficient way to determine how information packets that are received by the device through the network should be processed. In present systems, the CPU would have to be activated to process the incoming information to see if the entire device should be activated. This requires the use of a lot of extra hardware which uses a lot of energy which, in turn, means a shorter battery life. Also, if there is a mistake in the Destination Address, the information packet sent may be received by a subsystem, i.e. input/output (I/O) interface, that should not receive the information packet.

Thus, the ability to be able to remotely wake-up a device in the low power mode and to transmit and process information quickly and accurately which is transmitted over a network is of importance to both manufacturers and consumers alike.

SUMMARY OF THE INVENTION

The present invention solves the aforementioned and related problems of remotely waking up a device in a low power mode forming part of a node of a network and further transmitting information sent via a LAN to the correct node or device. Disclosed herein are a special information packet structure and I/O device used for listening for the special information packet. Once the special information packet is received, the CPU will be activated and further received data will be sent to the awakened device for further processing, if any. If the special information packet received by the I/O device is not intended to be sent to the particular node that is listening for the information, the date will not be further processed by that particular node.

An advantage of the present invention is the ability to remotely wake-up a device coupled to a network when there is information to be processed by that particular device in the low power mode.

Another advantage of the present invention is the ability to transmit information to various users along the network without the use of the central processing unit.

Still another advantage of the present invention is that the same input/output device present in personal computers can be used.

A feature of the present invention is that it can be implemented with very few parts.

Another feature of the present invention is that it uses the same packet structure present in prior systems.

BRIEF DESCRIPTION OF THE DRAWINGS

These and other objects, advantages and features of the present invention will become apparent from the following description, taken in conjunction with the accompanying drawings, in which.

DESCRIPTION OF THE PREFERRED EMBODIMENT

Figure 1:
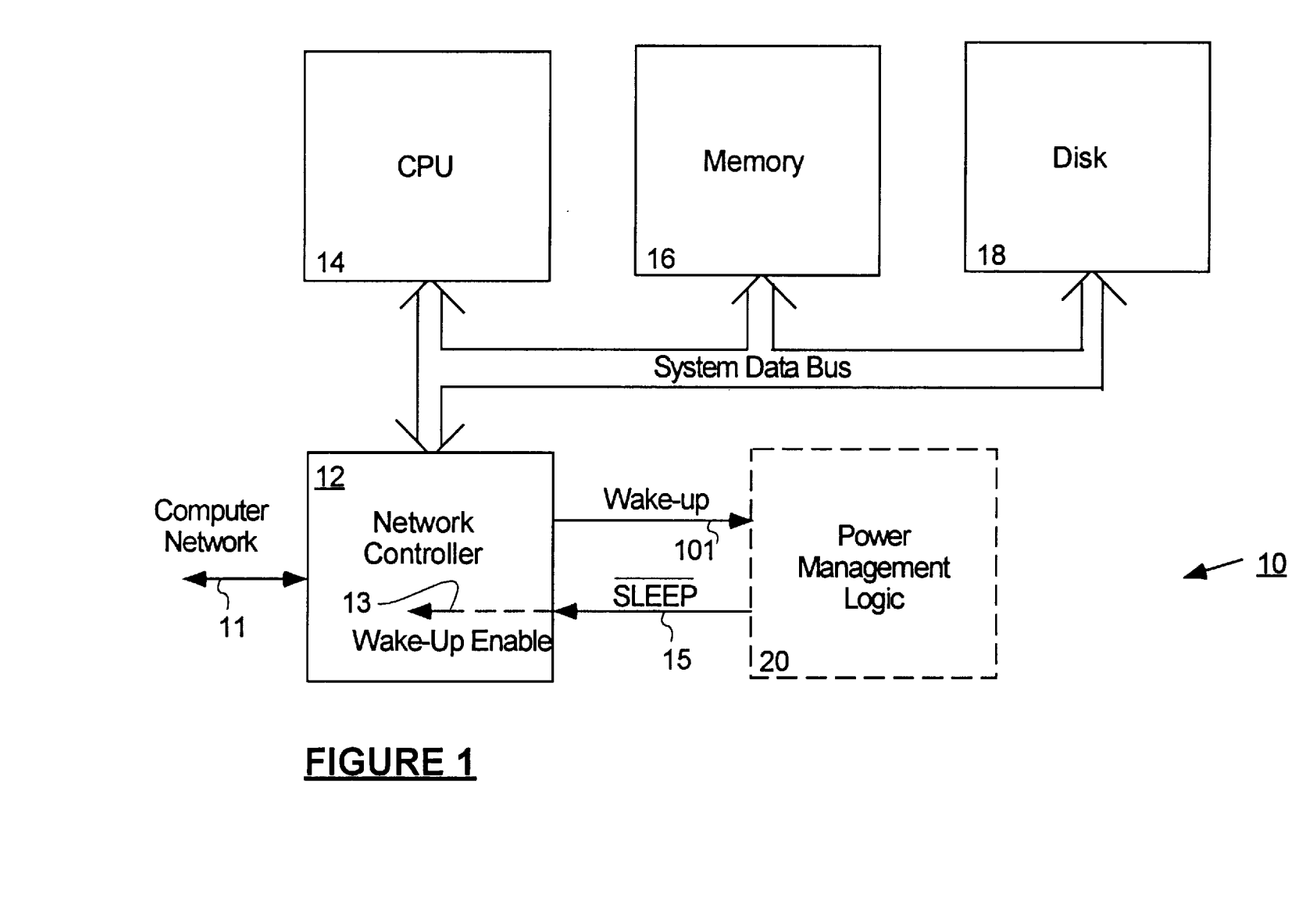
FIG. 1 is a block diagram of a personal computer system with low power operation capability that is connected to a network for remote wake-up.

A description of the information packet and the hardware which functions to generate a signal to wakeup a device in sleep mode via a local area network, will now be described with reference to FIGS. 1–4. FIG. 1 shows a block diagram of a digital device having remote wake-up capability. The device, in a preferred embodiment, is described as a power-managed personal computer system forming part of one node of a local area network (LAN) having a plurality of additional nodes with like power-managed devices forming parts of those additional nodes. The components that make up the remote wake-up section of the Network Controller as set out in greater detail in FIGS. 3 and 4 below, are placed on a single integrated circuit (IC) chip. However, other levels of integration are possible. For example, the Network Controller and the Power Management Logic may be placed on an IC chip. Also, all of the components that make up the device may be placed on a single IC chip or a series of chips. Further, it will be known to those of ordinary skill in the art that the personal computer system represented here can be a more complex system.

In the preferred embodiment, the personal computer system 10 is connected to form part of one node of a network, which in this case is the ethernet, via line 11. The ethernet is coupled to the network controller 12, which in turn is coupled to the Central Processing Unit (CPU) 14, Memory Unit 16, and Disk 18 of the personal computer system 10 via the system data bus. The network controller 12, which is located within the input/output (I/O) subsystem of the personal computer system 10 is also coupled to a Power Management Logic Block 20 via wake-up line 101 and an active low sleep line (SLEEP) 15. The Power Management Logic Block 20 is coupled to the CPU 14 for providing power conservation capability to the personal computer system 10. The powering down of the components of a personal computer system 10 is known to those of ordinary skill in the art and will not be discussed further herein.

Figure 2:
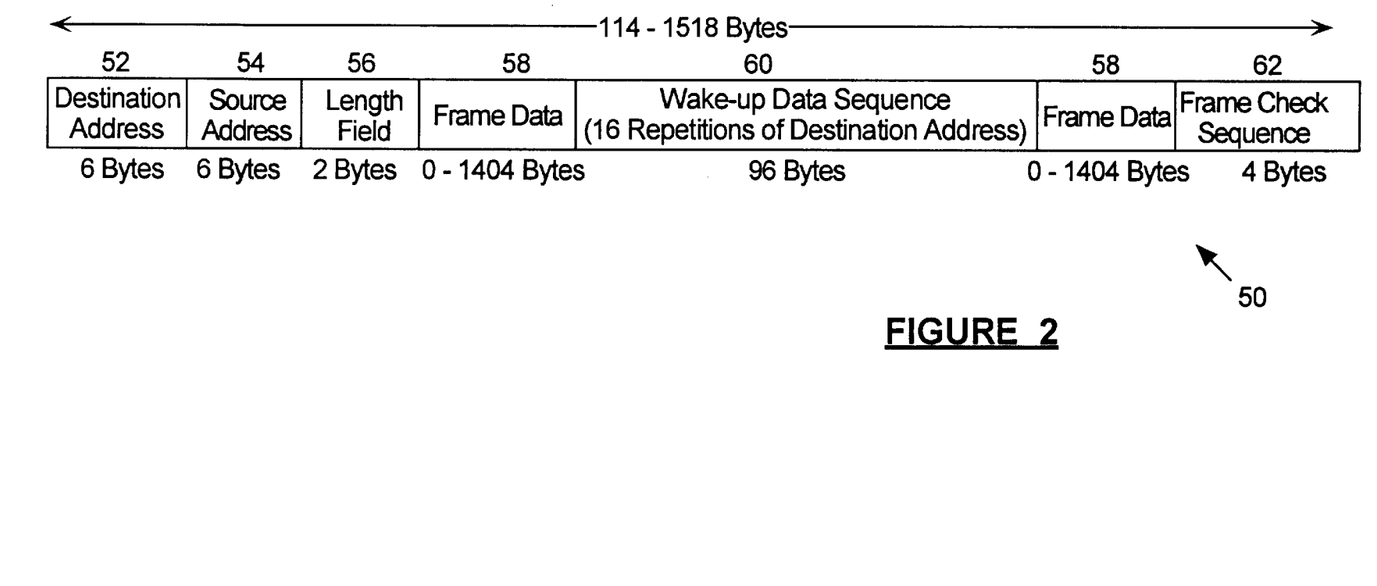
FIG. 2 is a schematic view of the remote wakeup packet fort of the present invention.

The structure of the information packet 50 which is transmitted through the ethernet and contains the remote wake-up information of the present invention is shown in FIG. 2. The information packet 50 that is transmitted through the ethernet is generated by a source node remote from the personal computer system 10 by a combination of software and hardware similar to that discussed above. It is understood that any node of a network can act as a source node for transmitting information to the other nodes of the network. The personal computer system 10 of the present invention in conjunction with the appropriate software and hardware (not shown) can act as a source node and transmit information to the plurality of nodes coupled to the network. The information packet 50 is partitioned into 6 different fields. The first field contains the 6-byte Destination Address 52 indicating where the information packet 50 is to be sent. The second field contains a 6-byte Source Address 54 indicating where the information packet 50 originated from. The third field is a 2-byte length field 56 which contains the length of the frame data within the information packet 50. The fourth field is the Frame Data block 58 which may vary from 0 to 1404 bytes in length containing the data to be processed. In the preferred embodiment of the present invention a 96 byte wake-up data sequence 60, comprising 16 consecutive repetitions of the Destination Address 52 is embedded within the Frame Data block 58. The wake-up data sequence can be located anywhere within the Frame Data block 58. Finally, the sixth field contains a 4-byte Cyclic Redundancy Check (CRC) error control code 62 for checking the accuracy and reliability of the data 58 that was transferred by the information block 50. The total length of the information packet 50 of the present invention may vary from 114 to 1518 bytes. The functions of the particular information packet 50 discussed above will be described in greater detail below.

Figure 3:
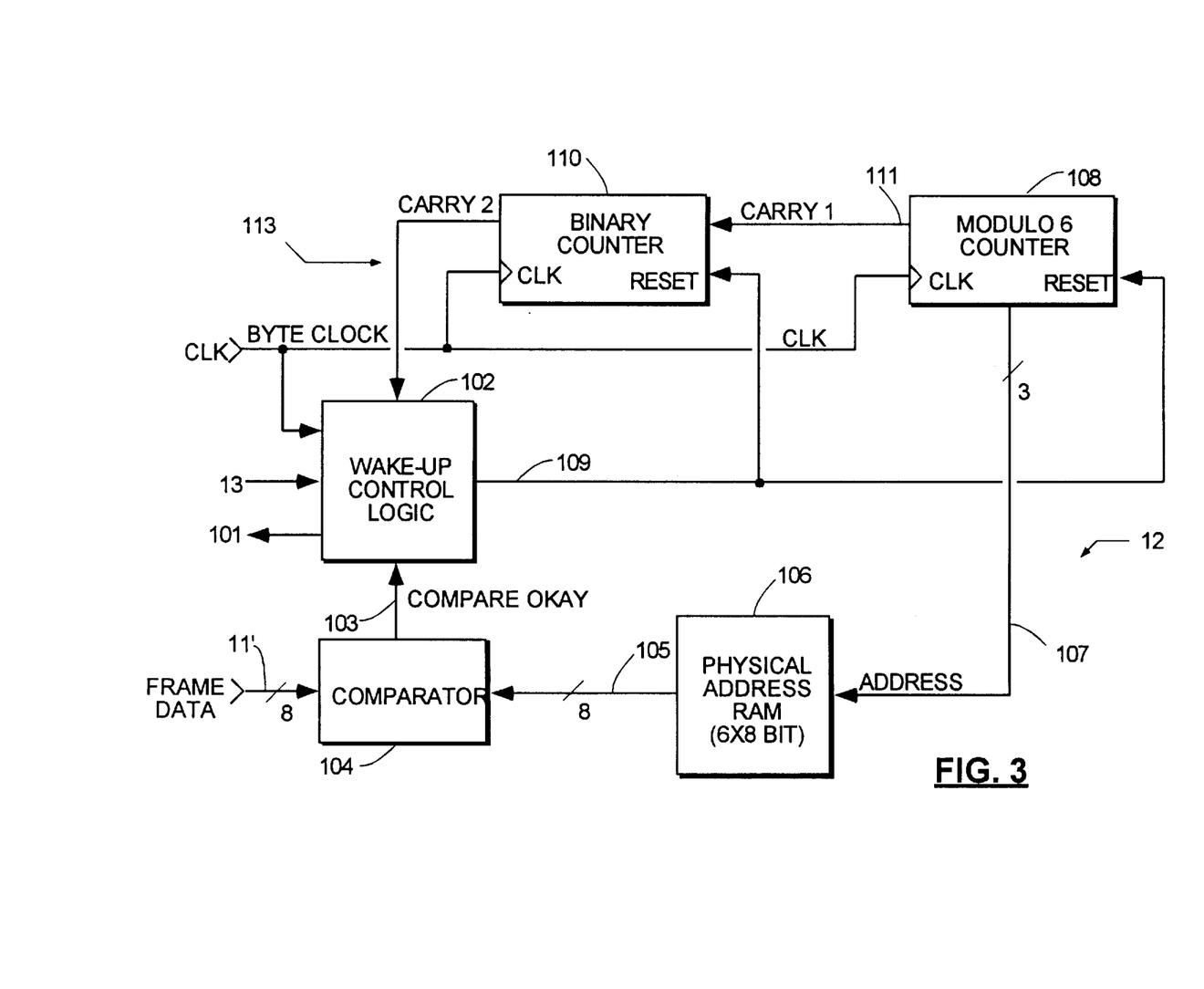
FIG. 3 is a block diagram of the remote wake-up section of the network controller of the present invention.

FIG. 3 illustrates in greater detail, the components which comprise the remote wake-up section of the network controller 12 of the present invention. Data from the information packet 50 transmitted through the ethernet 11 is sent to a comparator 104 via line 11'. The comparator 104 is also coupled to a 48-bit Physical Address RAM 106 which is separated into six (6) 8-bit registers, containing the particular physical address of the node on line 105. In the preferred embodiment of the invention, the node address is that of the personal computer system 10. Although the physical address is used to address the particular node in the preferred embodiment, any unique network identifier can be used in accordance with the present invention. Output of the comparator 104 is transmitted to the wake-up control logic block 102 via compare okay line 103. The other inputs to the wake-up control logic block 102 are the wake-up enable line 13 which is transmitted from inside the network controller 12, a byte clock signal on line CLK and the carry 2 output line from the binary counter 110 via line 113. The wake-up control logic 102 is further coupled to the RESET pin of the binary counter 110 and a modulo 6 counter 108 via line 109. Three outputs of the modulo 6 counter 108 are transmitted to the Physical Address RAM 106 via line 107. The other output of the modulo 6 counter, the carry 1 output, is transmitted to the binary counter 110 via line 111. The function of the network controller 12 will be described in greater detail below.

Figure 4:
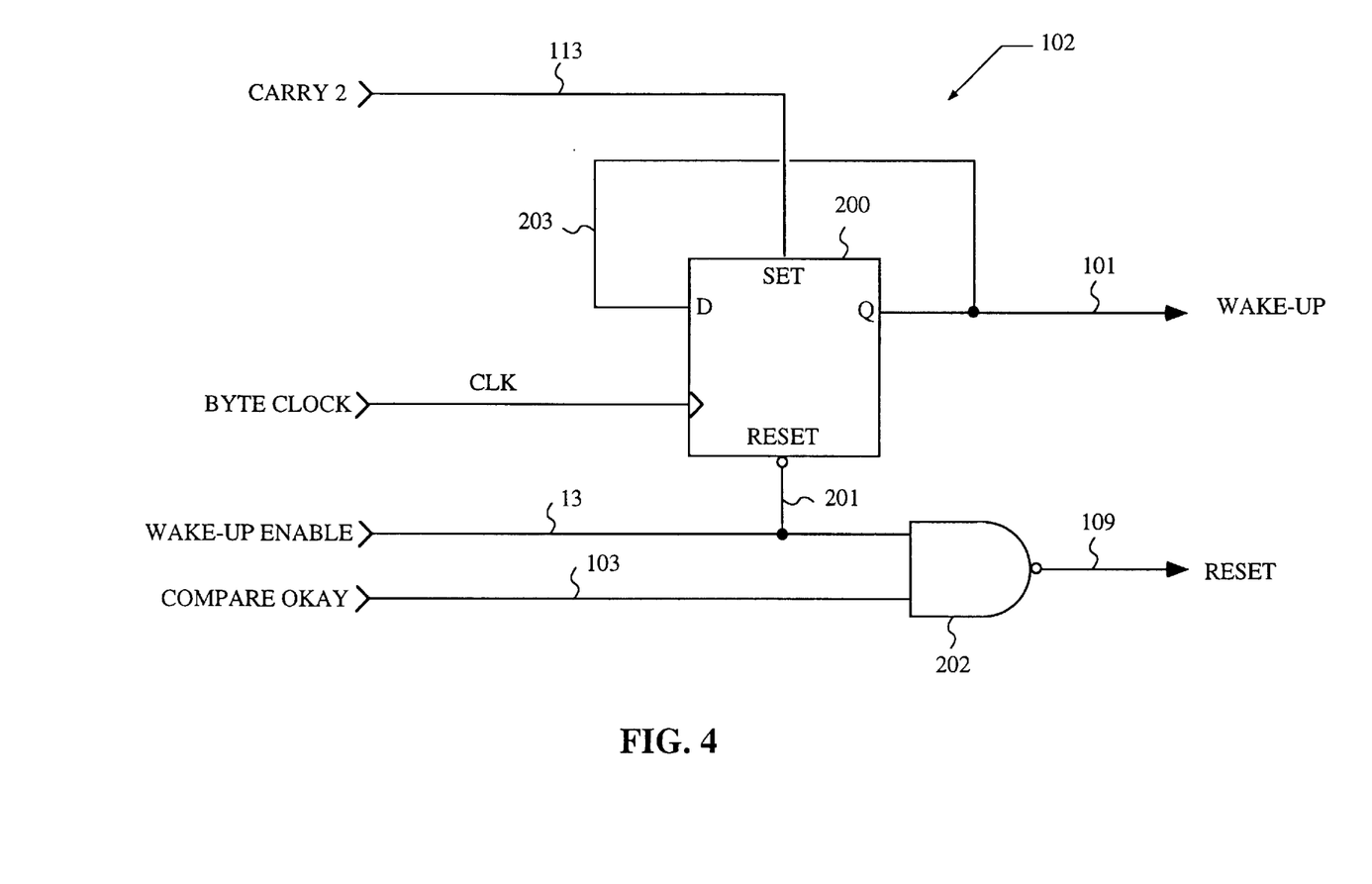
FIG. 4 is a block diagram of the wake-up control logic of the network controller of the present invention.

FIG. 4 illustrates a schematic diagram of the wake-up control logic 102 of the present invention. The carry 2 output line of the binary counter 110 is coupled to the SET pin of the D flip flop ("flip flop") 200 via line 113. The byte clock CLK signal is transmitted to the clock input of the flip flop 200. The wake-up enable line 13 is coupled to both the active low RESET pin 201 of the flip flop 200 and to one input to NAND gate 202. The second input to the NAND gate 202 is the compare okay line from the comparator 104 on line 103. The output of the NAND gate 202 is fed into both the RESET pin of the modulo 6 counter 108 and the RESET pin of the binary counter 110 via line 109. The output of the flip flop 200 is fed back into its input via line 203 and further acts as the wake-up frame received output line 101 of the system. The function of the wake-up logic 102 will be discussed in greater detail below.

The operation of the wake-up control logic 102 to generate the signal which powers up the personal computer system 10 of the present invention will now in be described with reference to FIGS. 3 and 4. The personal computer system 10 must be in a low power (sleep) mode before any wake-up capability is available. Thus, the Power Management Logic Unit 20 puts the personal computer system 10 into the low power mode by asserting the SLEEP line 15 to an active low (OV) state. When the SLEEP line 15 is active low, the wake-up enable line 13 is made active high, thereby placing the network controller 12 into the remote wake-up mode. When the network controller 12 is in the remote wake-up mode, it listens to the ethernet via line 11 for any information packets 50 that are being transmitted through the ethernet via line 11. When an information packet 50 reaches the personal computer system 10, it is first transmitted to the comparator 104 via line 11 where the Destination Address 52 of the information packet 50 is compared to the output of the Physical Address RAM 106 which has been loaded with the particular node address of the personal computer system 10 on line 105 to determine if the particular Destination Address 52 is connected to the node serviced by the particular network controller 12. If there is an address match, the compare okay line 103 is asserted active high and transmitted to the wake-up control logic block 102 via line 103. As long as there is an address match, the compare okay line 103 will remain active high. The wake-up enable line 13 is asserted via the SLEEP line 15. The wake-up enable line 13 is also used as a remote wake-up acknowledgement when the SLEEP line 15 is deasserted. After the comparator 104 receives the Destination Address 52 contained within the information packet 50, the Frame Data field 58 of the packet 50 is read to determine if the Destination Address 52 is present at least 16 consecutive times within the frame data 58 of the information packet 50. For each consecutive byte of received data, the byte clock line is toggled via line CLK incrementing the counters of both the modulo 6 counter 108 and the binary counter 110. When the modulo 6 counter 106 counts six transitions of the byte clock on line CLK the carry 1 output becomes active high and is transmitted to the binary counter 110 via line 111. The binary counter 110 continues to increment on each transition of the byte clock on line CLK until it reaches 16. At this point, the carry 2 line 113 becomes active high and is transmitted to the SET pin of the flip flop 200 of the wake-up control logic 102. When the count of the binary counter 110 reaches 16, this signifies that the frame data 58 of the information packet 50 needs to be processed by the CPU 14 of the personal computer system 10. The asserted carry 2 line 113 that is transmitted to the SET pin of the flip-flop 200, results in a wake-up signal on line 101 that is transmitted to the Power Management Logic 20 which indicates that the CPU 14 should be activated. After the Power Management Logic 20 has acknowledged the wake-up signal on line 101, the $\overline{\text{SLEEP}}$ line 15 is deasserted which deasserts the wake-up enable line 13. The compare okay line 103 is also made active low, thereby causing the output of the NAND gate 202 on line 109 to become active high thus resetting the modulo 6 counter 108 and the binary counter 110 to zero.

Once the frame data 58 has been transmitted from the network controller 12 to the CPU 14 of the personal computer system 10, the personal computer system 10 will stay in the active state while there is processing being done on the frame data 58 that is read from future information packets 50 received by the network controller 12. Once the processing of the frame data 58 is complete, and after a predetermined time of inactivity, the Power Management Logic 20 will again power down the personal computer system 10 by making the $\overline{\text{SLEEP}}$ line 15 active low which will assert the wake-up enable line 13, thereby putting the personal computer system 10 back in the remote wake-up mode to listen for another information packet 50.

Figure 5:
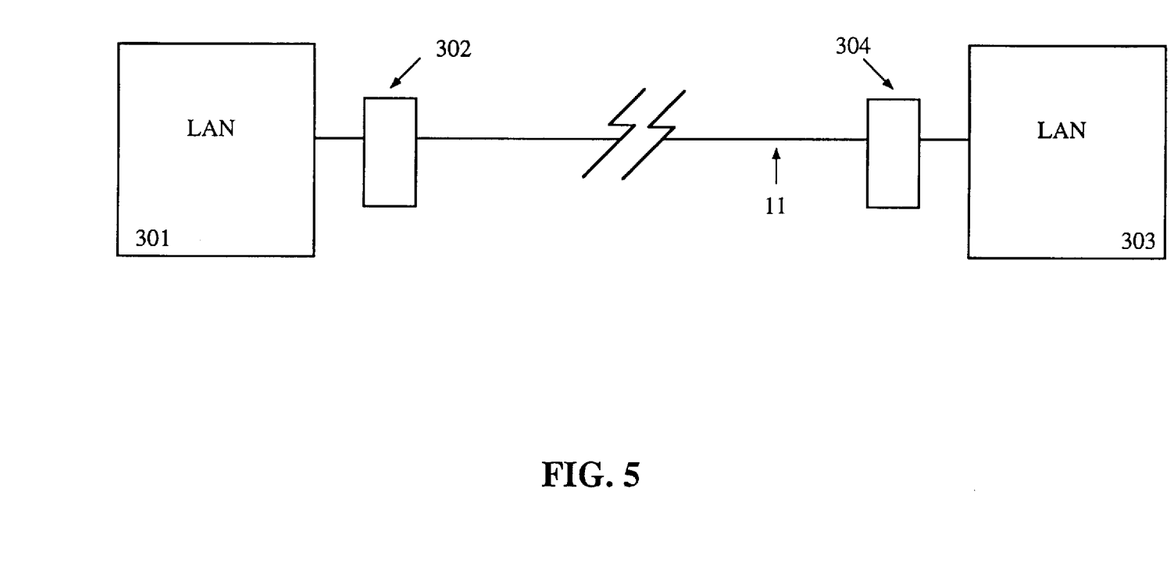
FIG. 5 is a block diagram illustrating multiple systems connected to a network for remote wake-up according to the present invention.

FIG. 5 illustrates an alternate embodiment of the present invention having a first LAN 301 and a second LAN 303 coupled to the computer network 11 via routers 302 and 304, respectively. The first LAN 301 may be a token ring network, an Apple talk network, or any of a variety of local area networks having nodes connected to the computer network 11. In the preferred embodiment, LAN 301 contains the personal computer system 10 of the present invention. LAN 303 can be a local network containing UNIX workstations, Apple MACINTOSH# stations, or any other information system. To show the flexibility of the packet structure 50 of the present invention, reference is made to FIG. 5.

When information packets must be transmitted outside a LAN to another LAN, that packet must be passed through routers or bridges before being received by the destination LAN. When information is passed through the routers, the packet structure may change. For example, the length of the packet, the CRC, the location of the data portion or the type of packet may all change when the packet is transmitted through a router. This situation is handled by the structure of the packet 50 of the present invention. When packets are transmitted out of LAN 301, containing the personal computer system 10, via router 302 to LAN 303, the structure of the packet 50 may change when passed through router 304; however, the requirement of at least 16 consecutive repetitions of the destination address used to generate the wake-up signal as described above does not change. Hence, even if the data portions are separated and reconfigured by the routers, the same data sequence is preserved. Thus, if the transmitted packet 50 contains the wake-up sequence, the device in LAN 303 will generate a wake-up signal as discussed above. If the transmitted packet does not contain the wake-up sequence, the device present in LAN 303 will remain in the sleep mode.

The foregoing description of the preferred embodiment of the present invention has been presented for purposes of illustration and description. It is not intended to be exhaustive or to limit the invention to the precise form disclosed, and obviously many modifications and variations are possible in light of the above teaching. The system and method described for the remote wake-up of a personal computer system was chosen and described in order to best explain the principles of the invention and its practical application to thereby enable others skilled in the art to best utilize the invention in various embodiments and with various modifications as are suited to the particular use contemplated. For example, the personal computer system may be placed in the sleep mode via software control. It is intended that the scope of the invention be defined by the claims appended hereto.

What is claimed is:

1. In a communications system having a plurality of interlinked networks, each of said networks including a plurality of uniquely-addressed nodes, at least one of the nodes comprising a device configured for allowing a sleep mode, a method of remotely waking said device, said method comprising the steps of:

(a) receiving in the at least one sleep-mode allowing node, an information packet sent over said communications system, where said information packet contains a destination address field identifying the at least one sleep-mode allowing node and a data field;

(b) determining whether a wake-up subsequence corresponding to the unique node address of said sleep-mode allowing node occurs at least N consecutive times within said data field of the received information packet, where N is an integer greater than 1; and (c) initiating an awaking of said device in response to a finding by the determining step of said at least N consecutive occurrences of said wake-up subsequence.

2. The method of claim 1, wherein said step (b) of determining includes the step of:

(b1) counting the number of consecutive occurrences of said wake-up subsequence within said data field of the received information packet.

3. The method of claim 1, wherein the value of N is at least 16.

4. The method of claim 1, wherein said wake-up subsequence is a 6-byte sequence corresponding to the unique node address of said sleep-mode allowing node.

5. The method of claim 1, wherein said plurality of networks are local area networks.

6. The method of claim 1, wherein said plurality of networks are wide area networks.

7. The method of claim 1, wherein said device is powered by a battery.

8. The method of claim 1, wherein said device includes a portable computer.

9. The method of claim 1, wherein said device includes at least one of a central processing unit (CPU), a memory unit, and a disk unit where said at least one unit is placed in a power-conserving mode when said device is placed in the sleep mode.

10. The method of claim 1, wherein:

said step (a) of receiving an information packet that contains a destination address field identifying the at least one sleep-mode allowing node includes the step of:

(a.1) using comparison circuitry for comparing contents of the destination address field with a predefined identification of the at least one sleep-mode allowing node; and said step (b) of determining includes the step of:

(b.1) using at least part of said comparison circuitry for determining whether the wake-up subsequence corresponding to the unique node address of said sleep-mode allowing node occurs at least N consecutive times within said data field of the received information packet.

11. In a data exchange system having a plurality of individual nodes coupled to one another through a transmission medium having one or more routers, wherein at least one of the nodes includes a corresponding device that can be placed in a sleep mode of operation and thereafter awakened, a method of awakening the corresponding at least one device, said method comprising the steps of:

(a) receiving at said at least one node, one or more information packets each having a frame data block containing sequential data, where the sequential data has been transferred through said transmission medium, and where the received one or more information packets each includes a destination field containing a unique physical address of said at least one node;

(b) recovering the sequential data contained in the received one or more information packets;

(c) determining whether said unique physical address repeats at least N consecutive times within said recovered sequential data, where N is an integer greater than 1; and (d) initiating an awakening of said device in response to a finding by said determining step of N consecutive repetitions of said unique physical address in said recovered sequential data.

12. The method of claim 11, wherein the value of N is at least 16.

13. The method of claim 11, wherein said device is powered by a battery.

14. The method of claim 11, wherein said device includes at least one of a central processing unit (CPU), a memory unit, and a disk unit where said at least one unit is placed in a power-conserving mode when said device is placed in the sleep mode and said at least one unit is placed in a higher power mode when said device is awakened.

15. A data processing network comprising a plurality of linked and uniquely-identified data processing systems, wherein at least one of the data processing systems can be switched into a sleep mode of operation and thereafter awakened, and further wherein at least one of the data processing systems is linked to other portions of said data processing network by one or more routers, said data processing network having a special information packet wherein a frame data block of the special information packet travels through said data processing network by way of one or more of said routers and wherein said frame data block contains N consecutive repetitions of a wake-up subsequence, N being an integer greater than one, said subsequence corresponding to a unique network identifier of an awakenable one of said plurality of data processing systems, the N consecutive repetitions of the wake-up subsequence being operative to wake up the correspondingly-identified one of said plurality of data processing systems.

16. The data processing network of claim 15, wherein said unique network identifier comprises a physical address of a respective and awakenable one of said plurality of data processing systems.

17. The data processing network of claim 16, wherein an awakenable one of said plurality of data processing systems includes counting means for counting the number of consecutive repetitions of the wake-up subsequence.

18. The data processing network of claim 15, wherein an awakenable one of said plurality of systems includes a controller means which remains awake for receiving and evaluating packets to detect presence of N consecutive repetitions of the wake-up subsequence for that system when the awakenable one of said plurality of systems is in the sleep mode of operation.

19. The data processing network of claim 15, wherein said value of N is at least 16.

20. The data processing network of claim 15, wherein said at least one data processing system is powered by a battery.

21. The data processing network of claim 15, wherein said at least one data processing system includes at least one of a central processing unit (CPU), a memory unit, and a disk unit where said at least one unit is placed in a power-conserving mode when said at least one data processing system is placed in the sleep mode and said at least one unit is placed in a higher power mode when said at least one data processing system is awakened.

22. The data processing network of claim 15, wherein an awakenable one of said plurality of data processing systems includes:

comparison means for comparing the N consecutive repetitions of the wake-up subsequence with the unique network identifier of said awakenable one of said plurality of data processing systems, wherein at least part of said comparison means is further for determining whether the special information packet is addressed to said awakenable one of said plurality of data processing systems.

23. A data processing network, comprising:

a plurality of nodes, at least one of said plurality of nodes having an awakenable device coupled to receive network data, the awakenable device being switchable into a sleep mode;

power management means for controlling provision of power within said awakenable device; and a router coupled to transmit information packets through said network, each of said information packets having a data carrying portion;

said at least one of the nodes having receiving means, coupled to said network, for receiving said information packets, said receiving means including determining means for determining while the corresponding awakenable device is in the sleep mode, whether said data carrying portion of each received packet contains a unique physical address of said at least one node occurring at least N consecutive times, where N is an integer greater than 1;

wherein upon detecting the N consecutive occurrences of said unique physical address, the receiving means initiates an awakening of the awakenable device.

24. The network of claim 23, wherein the value of N equals 16.

25. The network of claim 23, wherein said receiving means further includes a counter.

26. The network of claim 23, wherein said N consecutive occurrences of the physical address of said node can occur anywhere within said data carrying portion.

27. A system for allowing awakening of a sleeping portion of an addressable first node belonging to a first network of uniquely addressable nodes, where the first network is coupled by at least one router to a second network of uniquely addressable nodes, said addressable first node comprising:

a packet receiver capable of receiving information packets transmitted over the first network from other nodes of said first network or from the nodes of said second network, each packet including a destination address field and a data field;

a sequence recognizer coupled to the packet receiver, for recognizing the presence within the data field of each received packet, of a consecutive repetition of an address subsequence corresponding to the unique address of the first node; and an awakening mechanism, responsively coupled to the sequence recognizer, for initiating awakening of the sleeping portion of the addressable first node in response to the sequence recognizer recognizing the presence within the data field of the received information packets, of the consecutive repetition of the address subsequence.

28. The system of claim 27, wherein the unique address of the first node is the physical address of the first node.

29. In a communications system having a plurality of interlinked networks, each of said networks including a plurality of nodes each having a unique address, at least one of the nodes being a sleep-mode allowing node having a device that may be placed in a sleep mode and thereafter awakened, a method of remotely awakening said device, said method comprising the steps of:

(a) receiving in the at least one sleep-mode allowing node, one or more information packets sent over said communications system, where each such received information packet contains a destination address field identifying the receiving node and each such received information packet further contains a frame data field;

(b) determining whether within the frame data fields of a logically consecutive one or more of the received information packets there extends a wake-up sequence including the unique address of the receiving node repeated at least N consecutive times, where N is an integer greater than one; and (c) initiating an awakening of said device in response to a finding by said determining step of said wake-up sequence.

30. In a data exchange system having a plurality of individual nodes coupled to one another through a transmission medium having one or more routers, wherein at least one of the nodes is a switchable node that includes a corresponding device which can be placed in a first mode of operation and thereafter switched to a second mode of operation, a method of remotely switching the device from the first mode of operation to the second mode of operation, said remote switching method comprising the steps of:

(a) receiving at a given, switchable node, one or more information packets each having a frame data block containing sequential data, where the sequential data has been transferred through said transmission medium, and where the received one or more information packets each includes a destination field containing a destination address referencing the switchable node;

(b) recovering the sequential data contained in the received one or more information packets;

(c) determining if the device is in said first mode of operation;

(d) determining whether a unique subsequence repeats at least N consecutive times within said recovered sequential data, where N is an integer greater than 1, and where the unique subsequence corresponds to the node-referencing destination address; and (e) initiating a switching of said device to the second mode of operation in response to a finding by said determining steps that the device is in said first mode of operation and there are N consecutive repetitions of said unique subsequence in said recovered sequential data.

31. A remote switching method according to claim 30 wherein said device consumes a first amount of power when in the first mode of operation and said device consumes a greater, second amount of power when in the second mode of operation.

32. A remote switching method according to claim 30 wherein said corresponding device includes at least one of a central processing unit (CPU), a memory unit, and a disk unit where said at least one unit is placed in a power-conserving mode when said corresponding device is placed in the first mode of operation and said at least one unit is placed in a higher power mode when said device is switched to the second mode of operation.

33. In a data exchange system having a plurality of individual nodes coupled to one another through a transmission medium having one or more routers, wherein at least one of the nodes is a switchable node that includes a corresponding device which can be placed in a first mode of operation and thereafter switched to a second mode of operation, a method of remotely switching the device from the first mode of operation to the second mode of operation, said remote switching method comprising the steps of:

(a) forming in a source node, a command packet having a destination field that contains a destination address referencing a switchable node, where the formed command packet further has a frame data block containing N consecutive repetitions of a unique subsequence, where the unique subsequence corresponds to the destination address of the switchable node; and (b) transmitting the command packet by way of said one or more routers.

34. A remote switching method according to claim 33 wherein said device of the switchable node referenced by the destination field consumes a first amount of power when in the first mode of operation and said device consumes a greater, second amount of power when in the second mode of operation.

35. A remote switching method according to claim 34 wherein said device of the switchable node referenced by the destination field switches to the second mode of operation if the device is in the first mode of operation and said device receives frame data containing N consecutive repetitions of said unique subsequence.

36. In switchable node of a data exchange system having a plurality of individual nodes coupled to one another through a transmission medium having one or more routers, wherein the switchable node includes a corresponding device which can be placed in a first mode of operation and thereafter switched to a second mode of operation, a method of responding to a remotely-sourced command that can switch the device from the first mode of operation to the second mode of operation, said method of responding to the remotely-sourced command comprising the steps of:

(a) receiving at said switchable node, one or more information packets each having a frame data block containing sequential data, where the sequential data has been transferred through said transmission medium, and where the received one or more information packets each includes a destination field containing a destination address referencing the switchable node;

(b) recovering the sequential data contained in the received one or more in formation packets;

(c) determining if the device is in said first mode of operation;

(d) determining whether a unique subsequence repeats at least N consecutive times within said recovered sequential data, where N is an integer greater than 1, and where the unique subsequence corresponds to the node-referencing destination address;

(e) initiating a switching of said device to the second mode of operation in response to a finding by said determining steps that the device is in said first mode of operation and there are N consecutive repetitions of said unique subsequence in said recovered sequential data; and (f) refusing to initiate a switching of said device to the second mode of operation if there is a respective finding by either of said determining steps that the device is not in said first mode of operation and there are not N consecutive repetitions of said unique subsequence in said recovered sequential data.

37. A method of responding to a remotely-sourced command according to claim 36 wherein said value of N is at least 16.

38. A method of responding to a remotely-sourced command according to claim 36 wherein said device consumes a first amount of power when in the first mode of operation and said device consumes a greater, second amount of power when in the second mode of operation.

* * * * *

UNITED STATES PATENT AND TRADEMARK OFFICE
CERTIFICATE OF CORRECTION

PATENT NO. : 5,835,719
DATED : November 10, 1998
INVENTOR(S) : Glen Gibson et al.

It is certified that error appears in the above-indentified patent and that said Letters Patent is hereby corrected as shown below:

```
Column 2, line 37, "fort" should be --format--.
Column 5, line 44, "MACINTOSH#" should be --MACINTOSH™--.
Column 10, line 67, "information" should be --information--.
```

Signed and Sealed this

Third Day of August, 1999

Attest:

Q. TODD DICKINSON

Attesting Officer

Acting Commissioner of Patents and Trademarks